United States Patent
Gupta et al.

(10) Patent No.: US 7,187,689 B1
(45) Date of Patent: Mar. 6, 2007

(54) SELF-CLEANING MECHANISM FOR ERROR RECOVERY

(75) Inventors: Anurag P Gupta, Saratoga, CA (US); Song Zhang, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1093 days.

(21) Appl. No.: 09/984,315

(22) Filed: Oct. 29, 2001

(51) Int. Cl.
*H04L 12/54* (2006.01)

(52) U.S. Cl. ........................... 370/429; 711/159
(58) Field of Classification Search ............ 370/230.1, 370/231, 230, 390, 371, 374, 378, 379, 381, 370/428
See application file for complete search history.

(56) References Cited

U.S. PATENT DOCUMENTS

| | | | |
|---|---|---|---|
| 5,438,575 A * | 8/1995 | Bertrand ................ 714/799 |
| 6,226,685 B1 * | 5/2001 | Chen et al. ............. 709/238 |
| 6,351,780 B1 * | 2/2002 | Ecclesine ................ 710/22 |
| 6,724,768 B1 * | 4/2004 | Melvin ................... 370/412 |
| 6,807,615 B1 * | 10/2004 | Wong et al. ............ 711/202 |
| 7,027,447 B2 * | 4/2006 | Robertson et al. ..... 370/395.62 |
| 2001/0038633 A1 * | 11/2001 | Robertson et al. ..... 370/412 |
| 2004/0162961 A1 * | 8/2004 | Lyon ....................... 711/207 |

* cited by examiner

*Primary Examiner*—Chau Nguyen
*Assistant Examiner*—Christopher Grey
(74) *Attorney, Agent, or Firm*—Harrity Snyder, LLP

(57) ABSTRACT

A system manages a buffer having a group of entries. The system receives information relating to a read request for a memory. The system determines whether an entry in the buffer contains valid information. If the entry is determined to contain valid information, the system transmits the information in the entry in an error message. The system may then store the received information in the entry. In another implementation, the system stores data in one of the entries of the buffer, removes an address corresponding to the one entry from an address list, and starts a timer associated with the one entry. The system also determines whether the timer has exceeded a predetermined value, transferring the data from the one entry when the timer has exceeded the predetermined value, and adds the address back to the address list.

40 Claims, 10 Drawing Sheets

SELF-CLEANING MECHANISM FOR ERROR RECOVERY

BACKGROUND OF THE INVENTION

1. Field of the Invention

The principles of the invention relates generally to error recovery, and more particularly, to data flow control error recovery in a network device.

2. Description of Related Art

Routers receive data on a physical media, such as optical fiber, analyze the data to determine its destination, and output the data on a physical media in accordance with the destination. In some router systems, data cells of a packet must be sent out in order based on a sequence number associated with each data cell. Gaps in sequence numbers may occur depending on the data cell type. When a memory read error occurs, such as a cyclic redundancy code (CRC) error, the sending of data cells affected by the error to a downstream device may become stalled. As a result, the downstream device may continually wait for missing data cells that will never arrive.

A conventional approach to the solving this problem involved the use of a single timeout mechanism at the downstream device. This approach, however, does not address the issue of sequence gaps. Because information about the data cells affected by the error, such as cell type, is not transmitted to the downstream device, the downstream device may needlessly wait for the timeout period to expire for data cells associated with a non-existing sequence number.

It is therefore desirable to improve flow control in a network device when memory read errors occur.

SUMMARY OF THE INVENTION

Systems and methods consistent with the invention address, among other things, traffic flow in a network device.

One aspect of the principles of the invention is directed to a method for managing a buffer having a group of entries. The method includes receiving information relating to a read request for a memory and determining whether an entry in the buffer contains valid information. The method further includes transmitting the information in the entry in an error message when the entry contains valid information and storing the received information in the entry.

A second aspect of the principles of the invention is directed to a system that includes a buffer and a self-cleaning engine. The buffer consists of a group of entries, where each entry is associated with a validity bit. The self-cleaning engine detects a traffic flow condition, determines whether the validity bit associated with one of the entries in the buffer is set in response to the traffic flow condition, and transmits an error message when the validity bit is set.

A third aspect of the principles of the invention is directed to a method for managing a buffer having entries, where each entry is configured to store data and is associated with a timer. The method includes storing data in one of the entries of the buffer, removing an address corresponding to the one entry from an address list, starting the timer associated with the one entry, determining whether the timer has exceeded a predetermined value, transferring the data from the one entry when the timer has exceeded the predetermined value, and adding the address back to the address list.

A fourth aspect of the principles of the invention is directed to a method for forwarding data. The method includes receiving data, determining whether an entry comprising information relating to the data is valid, transmitting the data and the entry information when the entry is valid, and dropping the data when the entry is invalid.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents of the claim limitations.

As described herein, a buffer management system is provided that improves traffic flow in a network device. In one implementation consistent with the principles of the invention, a circular buffer stores information relating to read memory requests. If an entry to which read request information is to be written already contains valid information, the valid information is transmitted downstream as an error cell and the new information is stored in the entry. This prevents information in the buffer from becoming stale. In addition, a self-cleaning engine clears out stale entries from the buffer during periods of inactivity.

System Configuration

Figure 1:
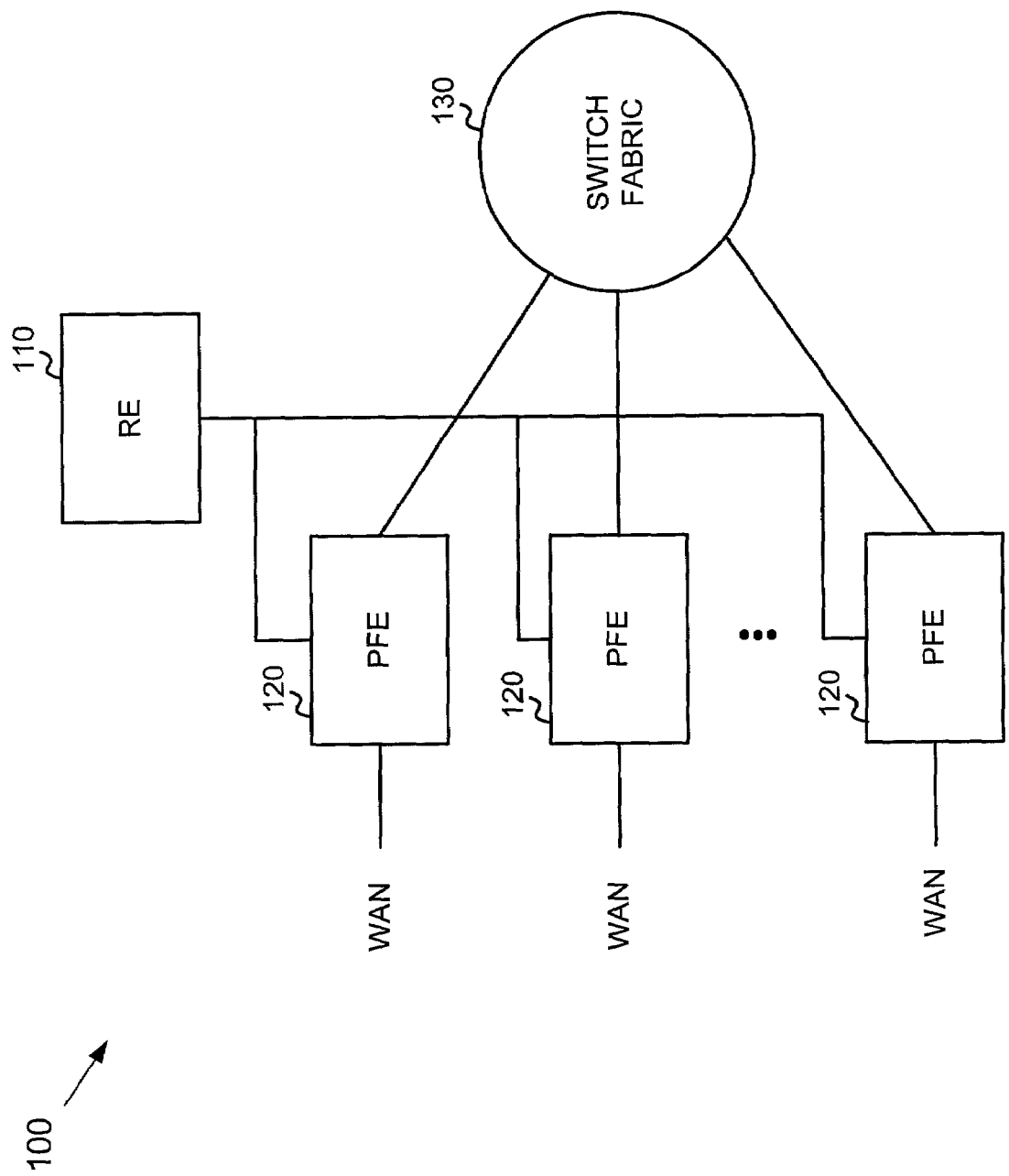
FIG. 1 illustrates an exemplary network device in which systems and methods consistent with the principles of the invention may be implemented.

FIG. 1 illustrates an exemplary network device in which systems and methods consistent with the principles of the invention may be implemented. In this particular implementation, the network device takes the form of a router 100. Router 100 may receive one or more data streams from a physical link, process the data stream(s) to determine destination information, and transmit the data stream(s) on one or more links in accordance with the destination information.

Router 100 may include a routing engine (RE) 110 and multiple packet forwarding engines (PFEs) 120 interconnected via a switching fabric 130. Switching fabric 130 may include one or more switching planes to facilitate communication between two or more of PFEs 120.

RE 110 may include processing logic that performs high-level management functions for router 100. For example, RE 110 may communicate with other networks and systems connected to router 100 to exchange information regarding network topology. RE 110 may create routing tables based on the network topology information and forward the routing tables to PFEs 120. PFEs 120 may use the routing tables to perform route lookup for incoming packets. RE 110 may also perform other general control and monitoring functions for router 100.

Each PFE 120 connects to RE 110 and switch fabric 130. PFEs 120 receive data on physical links connected to a network, such as a wide area network (WAN). Each physical link could be one of many types of transport media, such as optical fiber or Ethernet cable. The data on the physical link is formatted according to one of several protocols, such as the synchronous optical network (SONET) standard, or Ethernet.

Figure 2:
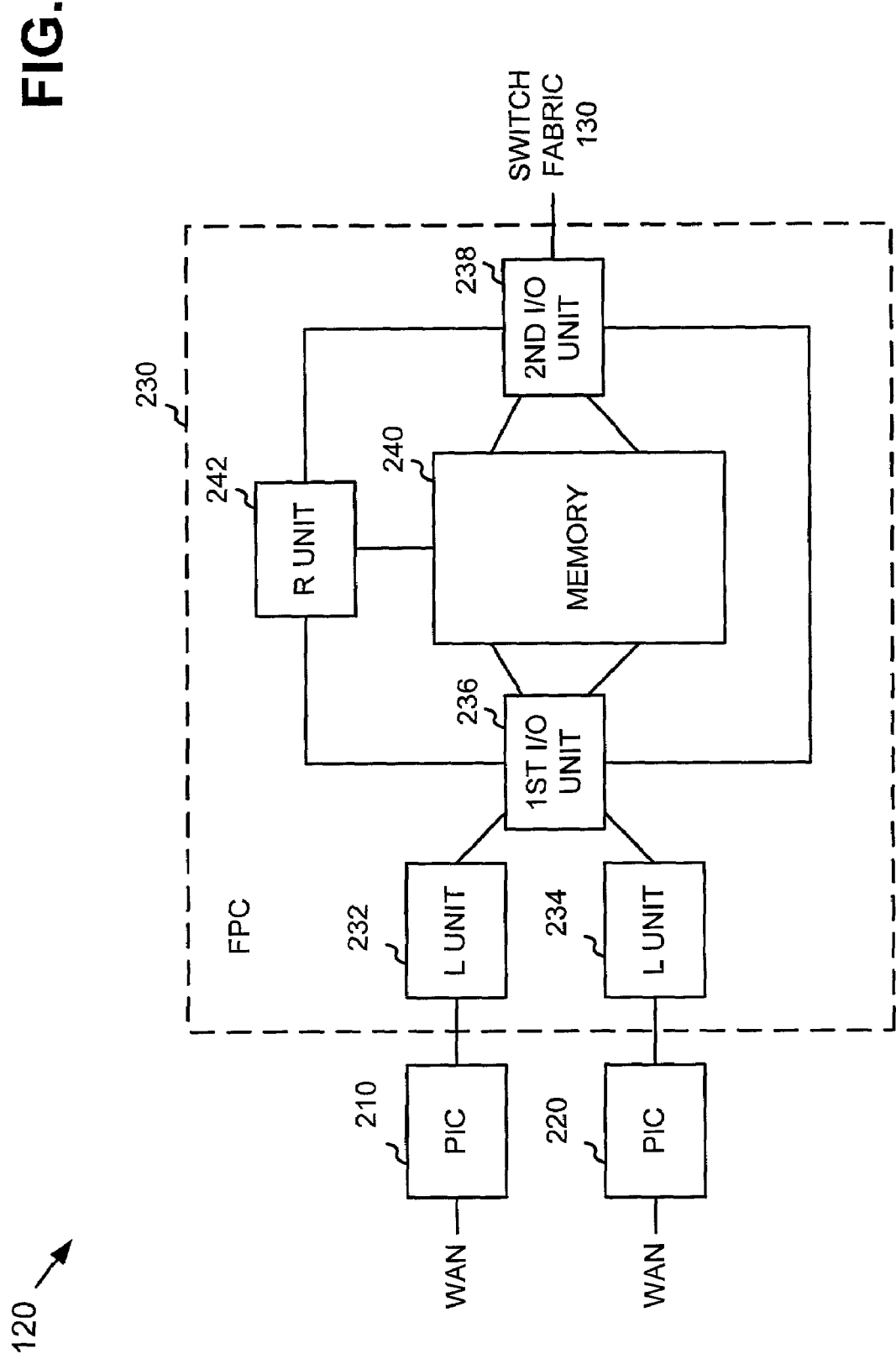
FIG. 2 illustrates an exemplary configuration of a PFE according to an implementation consistent with the principles of the invention.

FIG. 2 is an exemplary configuration of a PFE 120 according to an implementation consistent with the principles of the invention. PFE 120 may include physical interface cards (PICs) 210 and 220 connected to a flexible port concentrator (FPC) 230. While two PICs 210 and 220 are shown in FIG. 2, there may be more or less PICs in other implementations consistent with the principles of the invention.

PICs 210 and 220 connect to WAN physical links and FPC 230 and transport data between the WAN and FPC 230. Each PIC 210 and 220 transmits data between a WAN physical link and FPC 230. Each PIC 210 and 220 may be designed to handle one or more types of physical links. For example, a particular PIC may be designed to handle Ethernet communications.

For incoming data, in one embodiment, PICs 210 and 220 may strip off the layer 1 (L1) protocol information and forward the remaining data, such as raw packets, to FPC 230. For outgoing data, PICs 210 and 220 may receive packets from FPC 230, encapsulate the packets in L1 protocol information, and transmit the data on the physical WAN link.

FPC 230 performs packet transfers between PICs 210 and 220 and switch fabric 130. For each packet it handles, FPC 230 may perform route lookup based on packet header information to determine destination information and send the packet either to PIC 210 and 220 or switch fabric 130, depending on the destination information.

FPC 230 may include L units 232 and 234, first input/output (I/O) unit 236, second input/output (I/O) unit 238, memory 240, and R unit 242. Each L unit 232 and 234 corresponds to one of PIC 210 and 220. L units 232 and 234 may process packet data flowing between PICs 210 and 220, respectively, and first I/O unit 236. Each L unit 232 and 234 may operate in two modes: a first mode for processing packet data received from PIC 210 or 220 connected to it, and a second mode for processing packet data received from first I/O device 236.

In the first mode, L unit 232 or 234 may process packets from PIC 210 or 220, respectively, convert the packets into data cells, and transmit the data cells to first I/O unit 236. Data cells are the data structure used by FPC 230 internally for transporting and storing data. In one implementation, data cells are 64 bytes in length.

Packets received by L unit 232 or 234 may include two portions: a header portion and a packet data portion. For each packet, L unit 232 or 234 may process the header and insert the results of the processing into a notification. For example, L unit 232 or 234 might parse L2 and L3 headers of incoming packets to form a notification. The notification might include some of the original header information, as well as processed header information. L unit 232 or 234 may also create control information based on the packet. The control information may be based on the packet header, the packet data, or both. L unit 232 or 234 may then store the notification, control information, and the packet data in data cells, which it sends to first I/O unit 236.

In the second mode, L unit 232 or 234 handles data flow in a direction opposite the first mode. In the second mode, L unit 232 or 234 receives data cells from first I/O unit 236, extracts the notification, control information, and packet data from the data cells, and creates a packet based on the extracted information. L unit 232 or 234 creates the packet header from the notification and possibly the control information from the data cells. In one embodiment, L unit 232 or 234 creates L2 and L3 header information based on the notification and control information. L unit 232 or 234 may load the packet data portion with the packet data from the data cells.

First I/O unit 236 and second I/O unit 238 coordinate data transfers into and out of FPC 230. Upon receiving data cells, first I/O unit 236 and second I/O unit 238 may extract the notification stored in the data cells and may create a key based on the notification. The key may contain information used by R unit 242 to perform a route lookup, for data cells received from L unit 232 or L unit 234, or encapsulation lookup, for data cells received from another PFE via switch fabric 130.

First I/O unit 236 and second I/O unit 238 may store the data cells in memory 242. First I/O unit 236 and second I/O unit 238 may store in the notification address information identifying the locations of the data cells in memory 242. The address information may be extracted from the notification later and used to read the data cells from memory 240. First I/O unit 236 and second I/O unit 238 may send the notification and key to R unit 242. While first I/O unit 236 and second I/O unit 238 are shown as separate units, they may be implemented as a single unit in other embodiments consistent with the principles of the invention.

R unit 242 may receive keys and notifications from first I/O unit 236 and second I/O unit 238. R unit 242 may provide route lookup, accounting, and policing functionality. R unit 242 may receive one or more routing tables from RE 110 (FIG. 1) and use the keys and routing table(s) to perform route or encapsulation lookups. R unit 242 may insert the lookup result into a notification, which it may store in memory 240.

Memory 240 may temporarily store data cells from first I/O unit 236 and second I/O unit 238 and notifications from R unit 242. Memory 240 may dispatch the notifications to first I/O unit 236 and second I/O unit 238. In response, first I/O unit 236 and second I/O unit 238 may use the address information in the notification to read out data cells from memory 240 that correspond to a notification. The notification received from memory 240 has been modified, firstly by first I/O unit 236 or second I/O unit 238 with address information for the data cells stored in memory 240 and associated with the notification, and secondly by R unit 242 with route or encapsulation lookup results. First I/O unit 236 and second I/O unit 238 may also update the read out data cells with the modified notification. The data cells, which include the modified notification, are sent to L unit 232, L unit 234, or switch fabric 238, depending on which of first I/O unit 236 or second I/O unit 238 is processing the notification.

Figure 3:
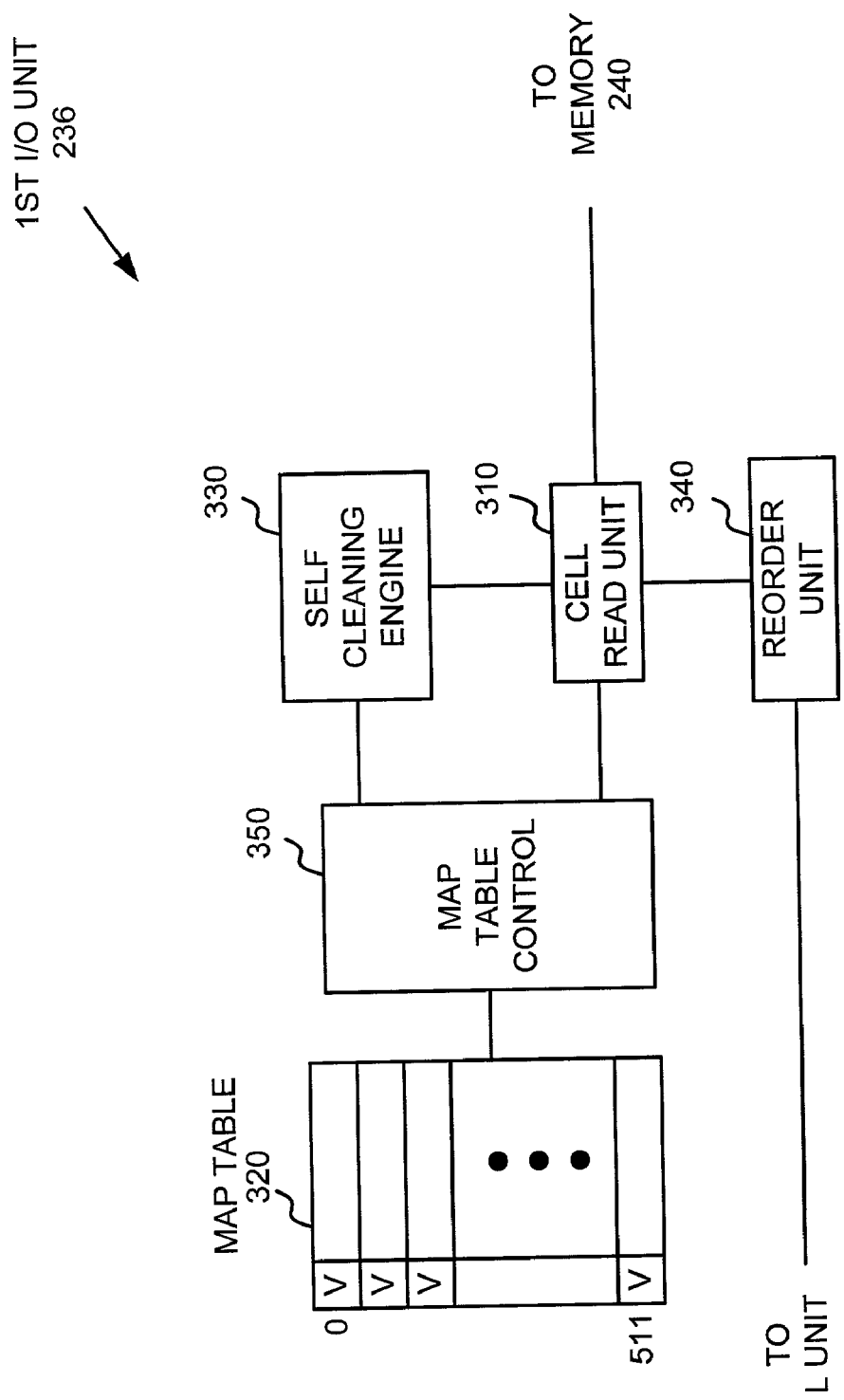
FIG. 3 illustrates an exemplary configuration of the first I/O unit of FIG. 2 according to an implementation consistent with the principles of the invention.

FIG. 3 is an illustration of certain data cell read out elements of first I/O unit 236 in one embodiment consistent with the principles of the invention. Second I/O unit 238 may be configured with similar elements. First I/O unit 236 includes a cell read unit 310, a map table 320, a self-cleaning engine 330, a downstream reorder unit 340 and a map table control 350.

Cell read unit 310 may receive a notification from memory 240 identifying data cells to be read out of memory 240. Each notification includes information related to the forwarding of one or more particular data cells. Cell read unit 310 may transfer cell information corresponding to the particular requested data cell to map table 320. This information may include, for example, cell type information, a sequence number, and destination information. Cell read unit 310 captures the address of the cell information in map table 320. Each notification includes information related to the forwarding of one or more particular data cells. Cell read unit 310 may issue data cell memory read requests to memory 240 based on cell address information stored in the notification. Cell read unit 310 includes, with each memory read request, the map table entry location information that stores the corresponding cell information in map table 320. When memory 240 returns the requested data cell, memory 240 also includes the map table entry location information in the memory read reply.

Cell read unit 310 may then use the map table entry location information to read the corresponding cell information from map table 320. Cell read unit 310 checks the validity indicator for the entry. If the entry is marked as valid, cell read unit 310 sends the data cell and the cell information to reorder unit 340.

If the entry is marked as invalid, meaning the entry has timed out, cell read unit 310 drops the data cell because, as will be described in more detail below, an error cell corresponding to the data cell has already been sent to reorder unit 340.

Map table 320 may store the cell information corresponding to cell read requests issued by cell read unit 310. Map table control 350 controls access to map table 320 by self-cleaning engine 330 and cell read unit 310. In an embodiment consistent with the principles of the invention, map table 320 may include 512 entries. Each entry in map table 320 may store cell information described above (e.g., cell type, sequence number, and destination information) corresponding to a particular data cell in memory 240 that cell read unit 310 has requested, as well as validity information (V) that indicates whether the map table entry contains valid cell information. A "1," for example, may indicate that the entry contains valid cell information, while a "0" may indicate that the entry is invalid, empty, or available. When cell read unit 310 receives a memory read reply from memory 240, cell read unit 310 may read the cell information in the corresponding entry in map table 320, and may send the cell information along with the data cell, downstream to reorder unit 340.

In an embodiment consistent with the principles of the invention, map table control 350 may manage map table 320 as a circular buffer, writing a new entry in the table each time cell read unit 310 requests a cell from memory 240 as a circular buffer. When a memory read reply does not return to cell read unit 310 by the time map table control 350 wraps map table 320 around to the map entry corresponding to the read request, the entry is timed out and read out to cell read unit 310. In response, cell read unit 310 sends an error cell downstream to reorder unit 340.

The self-cleaning engine 330 may time out stale entries in map table 320 during periods of inactivity. In one embodiment, self-cleaning engine 330 detects that traffic is not flowing to or from memory 240 for a predetermined period of time based on signals from either or both of map table control 350 or cell read unit 310 and, in response, walks through each entry of map table 320 to timeout any valid entries by making them invalid. When an entry is invalidated, self-cleaning engine 330 causes the cell information in the entry to be read out to cell read unit 310. Cell read unit 310 may place the cell information in an error cell and send it downstream to reorder unit 340.

Figure 4:
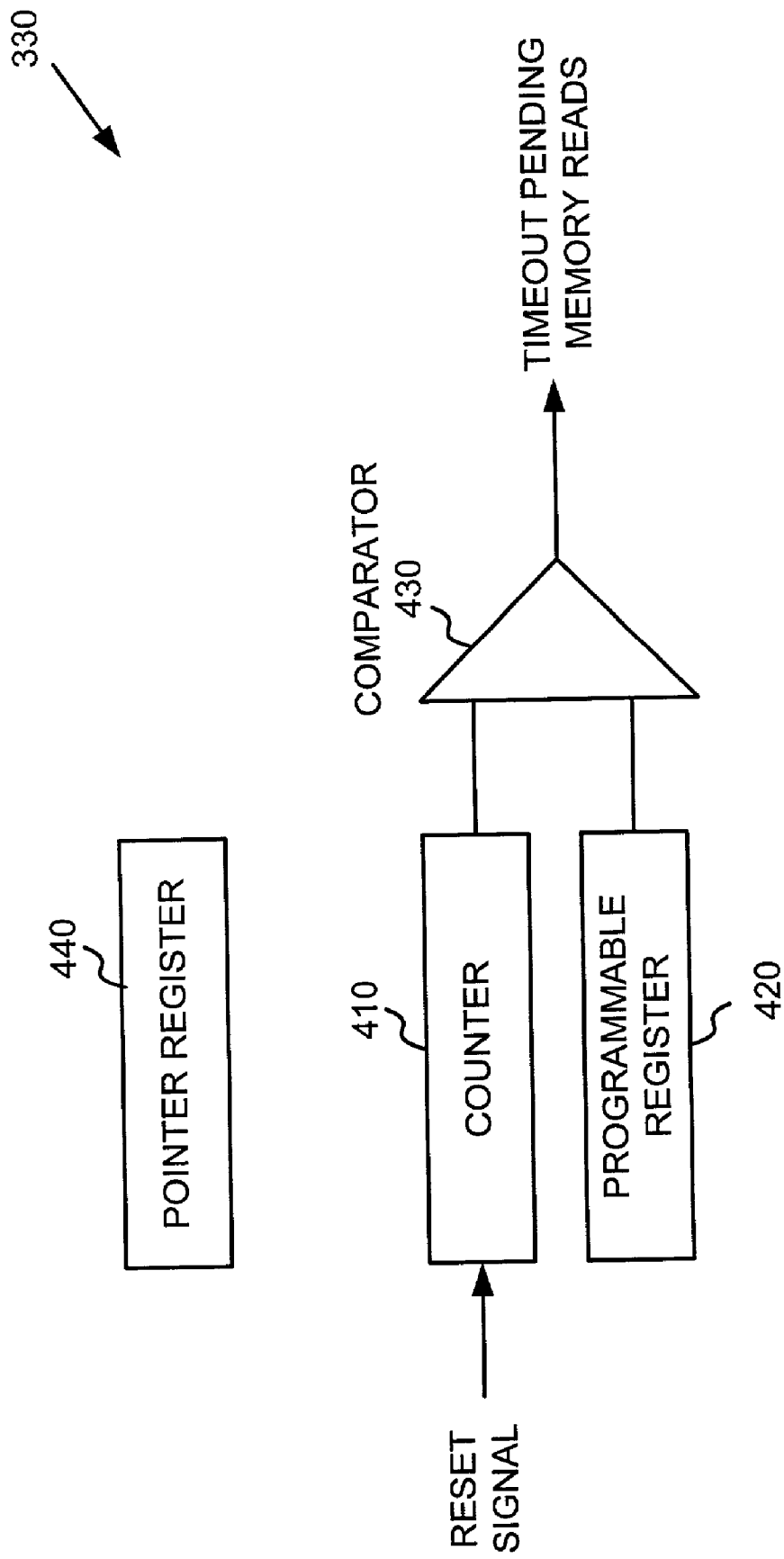
FIG. 4 illustrates an exemplary configuration of the self-cleaning engine of FIG. 3.

FIG. 4 illustrates an exemplary configuration of self-cleaning engine 330 of FIG. 3. As illustrated, self-cleaning engine 330 may include a counter 410, a programmable register 420, a comparator 430, and a pointer register 440. Counter 410 may include circuitry for tracking the period of time for which memory 240 is inactive based on signals from cell read unit 310 or memory 240 (connection not shown). Alternatively, counter 410 may track the amount of time that map table 320 is inactive based on signals from map 350. In one embodiment, counter 410 counts up from zero based on an input clock signal (not shown). Counter 410 may be reset, for example, each time memory 240 receives a read request from cell read unit 310 or issues a memory read reply to cell read unit 310.

Programmable register 420 may store a threshold timeout value. This timeout value may be set, for example, via a network administrator. Comparator 430 may include circuitry for comparing the value in counter 410 to the timeout value in programmable register 420. This comparison operation may, for example, occur each time the value in counter 410 increases. If the value in counter 410 equals or exceeds the timeout value in programmable register 420, comparator 430 outputs a signal indicating that any valid entries corresponding to pending memory reads in map table 320 should be invalidated and the cell information in the entry be sent to cell read unit 310, which sends error cells, including the cell information, to reorder unit 340.

Pointer register 440 may store a value pointing to an entry in map table 320 to which the next cell information is to be written. When counter 410 reaches the timeout value in programmable register 420, self-cleaning engine 330 starts at the current pointer value in pointer register 440 and begins walking through the entries in map table 320. Each time a valid entry is encountered, self-cleaning engine 330 directs map table control 350 to read out the cell information in the entry and send it to cell read unit 310. In response, cell read unit 310 sends an error cell, including the cell information, to reorder unit 340. The self-cleaning engine 330 stops when the pointer wraps around to the entry where the process started, or when memory 240 receives a read request from cell read unit 310 or issues a memory read reply.

Returning to FIG. 3, reorder unit 340 may receive data cells, along with the data cells' cell information from map table 320, and place the data cells in the correct order according to their associated sequence number and cell type. Once a segment of data cells, such as all data cells for a notification, has been received and placed in the correct order, reorder unit 340 may send the data cells to their destination. Reorder unit 340 may stall if any intervening sequence numbers that must not be skipped, based on cell-type, is not received as either a data cell or as an error cell. The mechanisms described above avoid this condition.

Exemplary Processing

Figure 5:
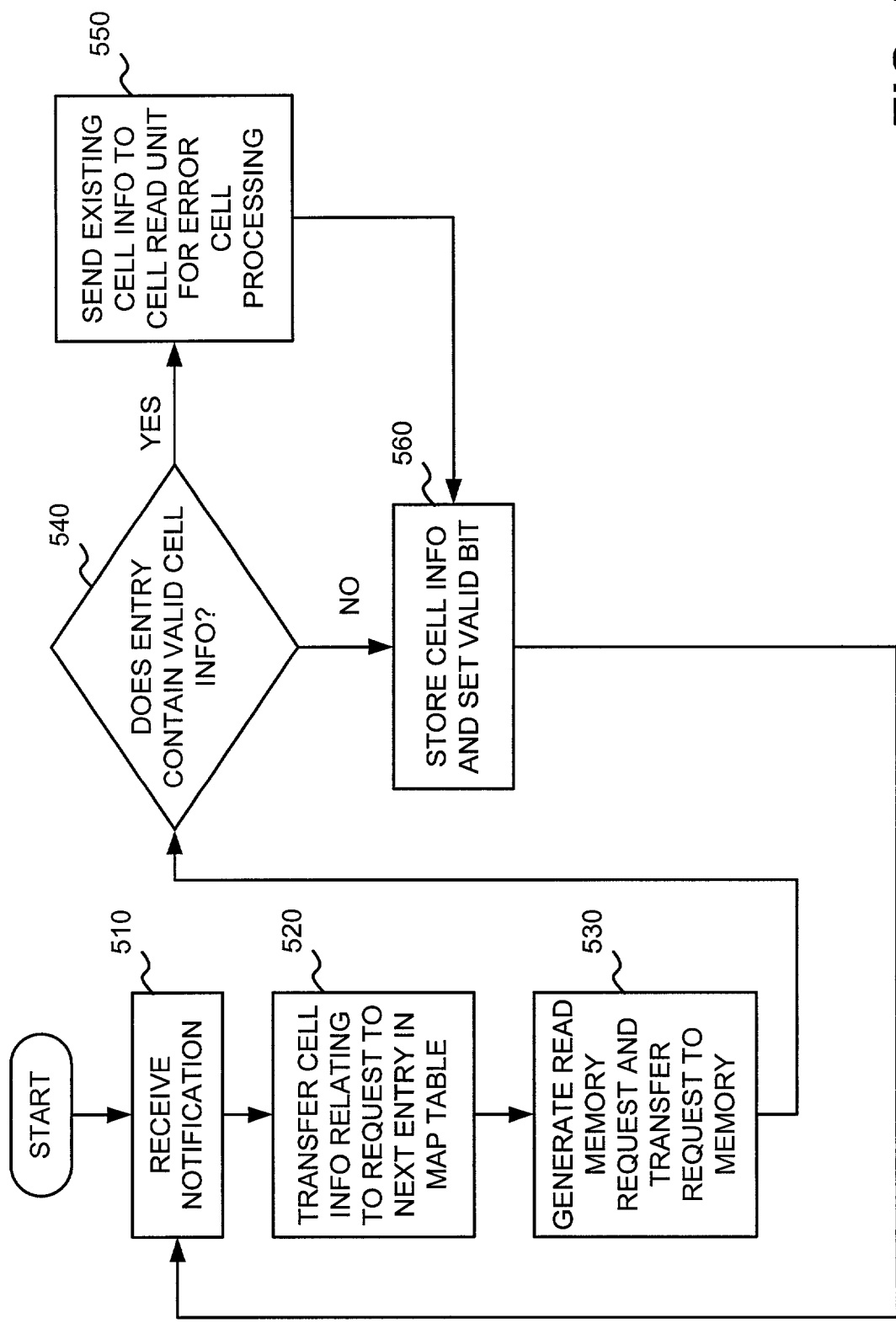
FIG. 5 illustrates an exemplary process for retrieving and forwarding data cells in an implementation consistent with the principles of the invention.

FIG. 5 illustrates an exemplary process for retrieving and forwarding data cells in an implementation consistent with the principles of the invention. Processing may begin with cell read unit 310 receiving a notification [act 510]. This notification may, for example, indicate that first I/O unit 236 is to forward one or more data cells from memory 240 to a particular destination.

In response to receiving the notification, cell read unit 310 may forward cell information, relating to each data cell read request, to map table 320 [act 520]. The cell information may include, inter alia, a sequence number, cell type information, and destination information. Cell read unit 310 may generate a read memory request for retrieving the data cells from memory 240 [act 530]. The read memory request may include the index of the entry in map table 320 as an identifier for the request. This index will be returned with the data cell from the memory 240. Cell read unit 310 may then forward the read memory request to memory 240 [act 530].

Cell read unit 310 may transfer cell information to map table 320 in a circular fashion. That is, cell read unit 310 may initially store information in the first entry in map table 320. It may then store subsequent cell information in the next succeeding entry in map table 320 until the last entry is filled. After storing cell information in the last entry in map table 320, cell read unit 310 may then begin storing information in the first entry again.

When storing cell information in map table 320, cell read unit 310 may determine whether the entry in which the cell information is to be stored contains valid cell information [act 540]. Cell read unit 310 may determine that an entry in map table 320 contains valid cell information by checking the validity bit associated with the entry. If the validity bit is set, the entry may be determined to contain valid cell information. If the validity bit is not set, the entry may be determined to be empty. The validity bit may be cleared (or not set) in those situations, for example, when cell read unit 310 receives the data cell from memory 240, reads the corresponding cell information from map table 320, and forwards the data cell and cell information to reorder unit 340 prior to the entry being sent to cell read unit 310 for error cell processing (i.e., prior to the cell information becoming stale).

If the entry is determined to contain valid cell information, cell read unit 310 may determine that the cell information in the entry is "stale" and transfer an error cell with the stale cell information to reorder unit 340 [act 550]. This cell information may have remained in map table 320 due, for example, to a memory read error. As described above, reorder unit 340 sends data cells out to their destinations in a correct order. By sending stale cell information to reorder unit 340, reorder unit 340 may continue operations without having to wait an extended period of time for this information. Such processing improves traffic flow in the network device.

After transferring the stale cell information to reorder unit 340 or in the event that the entry in map table 320 does not contain valid cell information, cell read unit 310 may then store the new cell information in the entry [act 560]. Cell read unit 310 may also set the validity bit associated with this entry to indicate that the cell information is valid [act 560].

Figure 6:
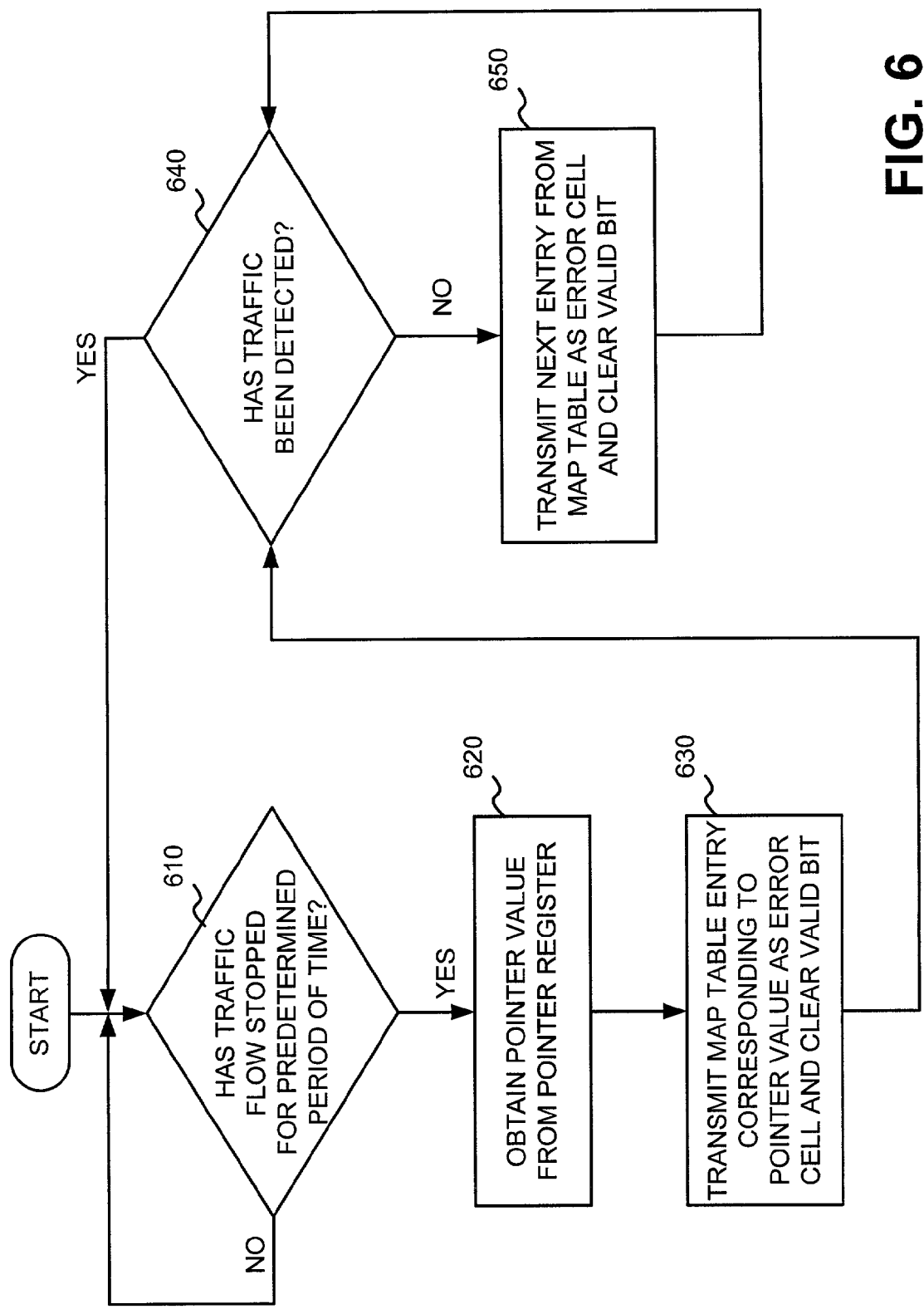
FIG. 6 illustrates an exemplary process for removing stale entries from the map table.

FIG. 6 illustrates an exemplary process for removing stale entries from map table 320. Processing may begin with self-cleaning engine 330 determining whether traffic flow has stopped for a predetermined period of time [act 610]. Self-cleaning engine 330 may make this determination by, for example, comparing the value in counter 410 to the value stored in programmable register 420. As described above, the counter value is increased when memory 240 (or map table 320) is inactive. If the value in counter 410 equals or exceeds the value stored in programmable register 420, self-cleaning engine 330 may determine that traffic flow has stopped.

When self-cleaning engine 330 determines that traffic to/from memory 240 has stopped, self-cleaning engine 330 may obtain the pointer value from pointer register 440 [act 620]. Self-cleaning engine 330 may then start cleaning out map table 320 starting at the entry corresponding to the pointer value [act 630]. Self-cleaning engine 330 may transmit the entry corresponding to the pointer value to cell read unit 310 for error cell processing. Self-cleaning engine 330 may also clear the validity bit associated with that entry. Similar to the technique described above with respect to FIG. 5, self-cleaning engine 330 clears stale entries from map table 320 to allow reorder unit 340 to continue operating without having to wait extended periods of time for cell information.

Once self-cleaning engine 330 clears the entry from map table 320 corresponding to the pointer value, self-cleaning engine 330 may determine whether traffic has been detected to/from memory 240 [act 640]. If traffic has been detected, the processing returns to act 610 to determine whether traffic flow has stopped for a predetermined period of time. If, on the other hand, no traffic has been detected, self-cleaning engine 330 clears the next entry from map table 320 that contains valid cell information [act 650]. Self-cleaning engine 330 may transmit this next entry to cell read unit 310 for error cell processing and may clear the validity bit. Processing may then return to act 640.

Alternative System Configuration

Figure 7:
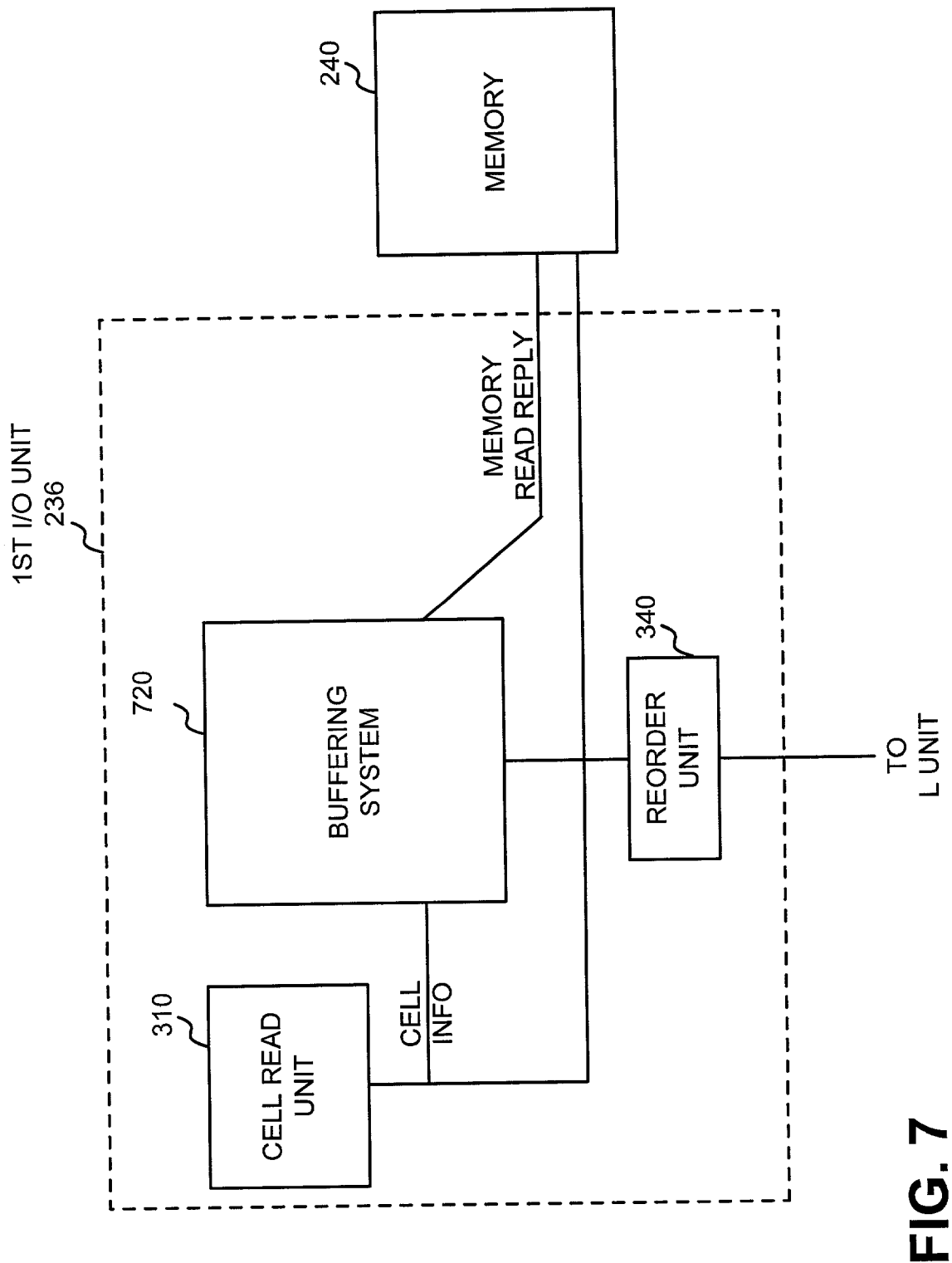
FIG. 7 illustrates an alternative configuration of the first I/O unit of FIG. 2.

FIG. 7 illustrates an alternative configuration of first I/O unit 236 of FIG. 2. As illustrated, first I/O unit 236 may include a cell read unit 310, a buffering system 720, and a downstream reorder unit 340. Cell read unit 310 and reorder unit 340 may be configured in a manner similar to that described above with respect to FIG. 3.

Figure 8:
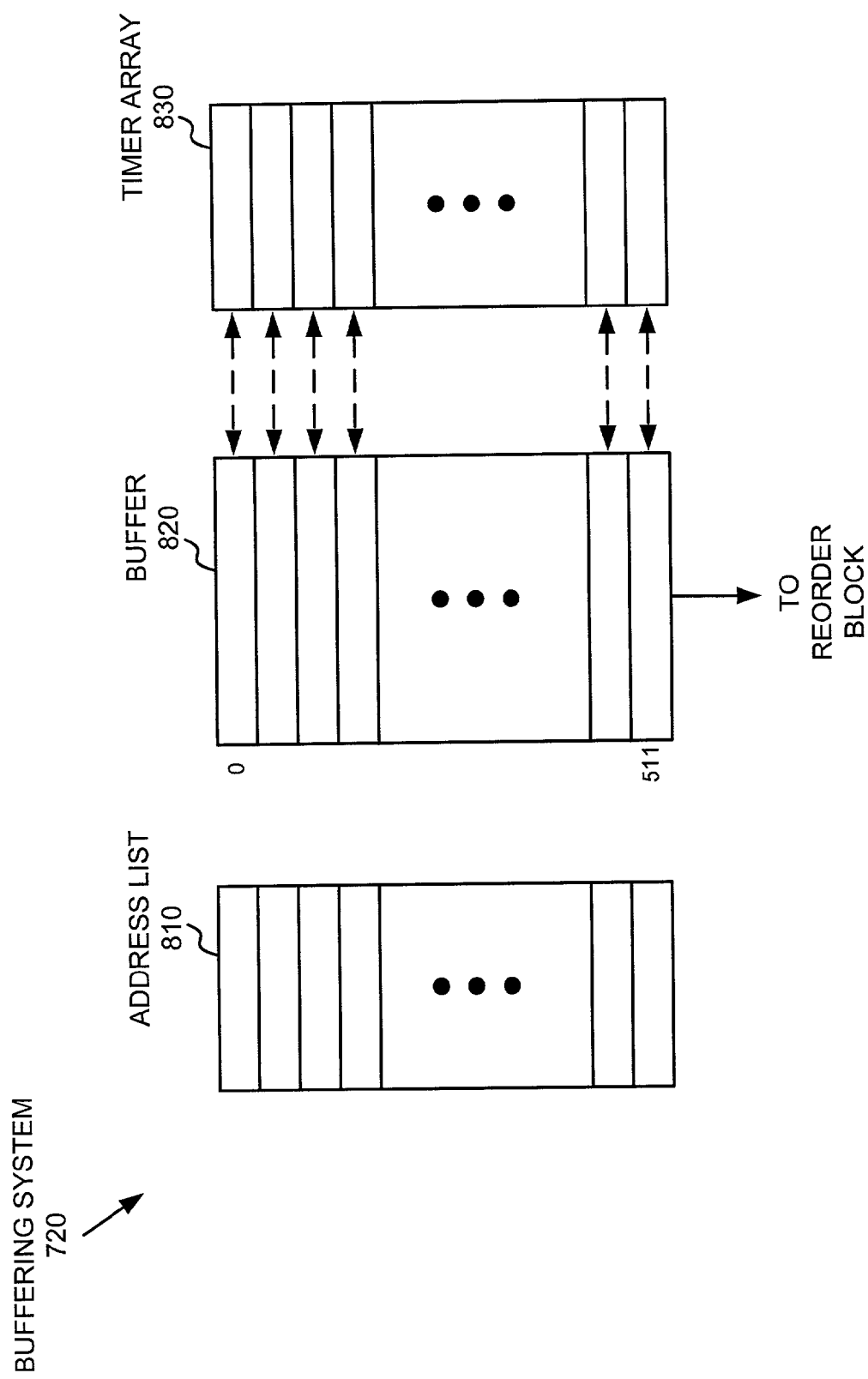
FIG. 8 illustrates an exemplary configuration of the buffering system of FIG. 7.

Buffering system 720 may store cell information and transmit the cell information along with the corresponding data cell to reorder unit 340. FIG. 8 illustrates an exemplary configuration of buffering system 720 of FIG. 7. As illustrated, buffering system 720 may include an address list 810, a buffer 820, and a timer array 830.

Address list 810 may queue addresses corresponding to available entries in buffer 820. Each time cell read unit 310 stores cell information in an entry in buffer 820, the corresponding address is dequeued from address list 810.

Buffer 820 may include memory devices having a group of entries corresponding to cell read requests issued by cell read unit 310. In an implementation consistent with the principles of the invention, buffer 820 may include 512 entries. Each entry in buffer 820 may store cell information such as cell type, sequence number, and destination information corresponding to a particular data cell in memory 240.

Timer array 830 may include an array of timers, one for each entry in buffer 820. In an implementation consistent with the principles of the invention, the timers may track the amount of time that cell information has been stored in a corresponding entry of buffer 820. If the time exceeds a predetermined threshold value, the timer may cause the corresponding entry to be read out, placed in an error cell, and transmitted to reorder unit 340. Accordingly, timer array 830 prevents entries in buffer 820 from becoming stale.

Exemplary Alternative Processing

Figure 9:
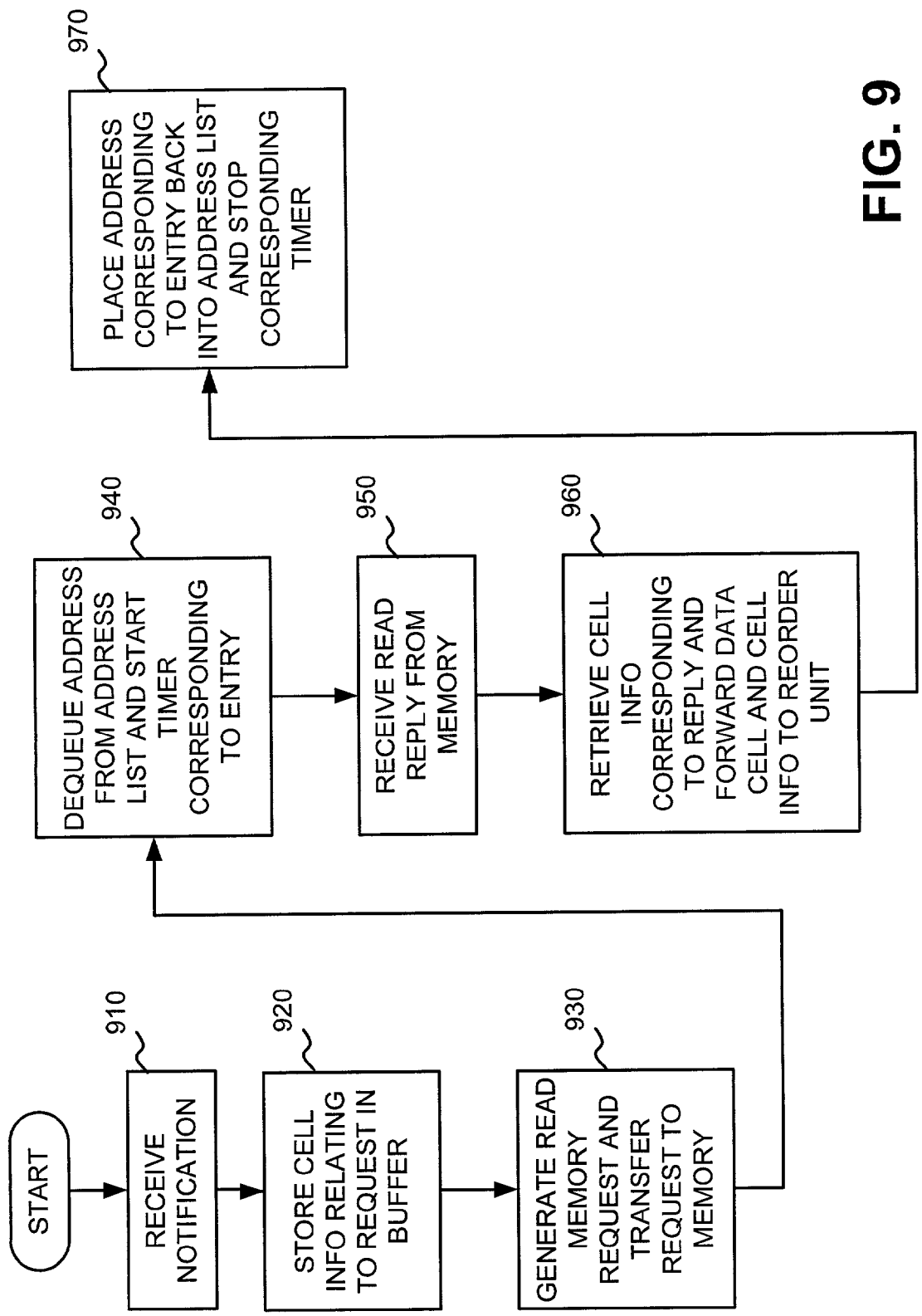
FIG. 9 illustrates exemplary processing for retrieving and forwarding data cells in an alternative implementation consistent with the principles of the invention.

FIG. 9 illustrates exemplary processing for retrieving and forwarding data cells in an alternative implementation consistent with the principles of the invention. Processing may begin with cell read unit 310 receiving a notification [act 910]. This notification may, for example, indicate that first I/O unit 236 is to forward one or more data cells from memory 240 to a particular destination.

In response to receiving the notification, cell read unit 310 may forward cell information, relating to the requested data cell, to buffering system 720 [act 920]. The cell information may include, inter alia, a sequence number, cell type information, and destination information. Cell read unit 310 may generate read memory requests for retrieving data cells from memory 240 [act 930]. Each read memory request may include the index of the entry in buffer 820 as an identifier for the request. It may be returned with the data cell when the data cell is read from memory 240. Cell read unit 310 may then forward a read memory request to memory 240 [act 930].

When storing the cell information in buffer 820, cell read unit 310 may determine an available entry in the buffer by accessing address list 810. Once an available entry has been identified, cell read unit 310 may store the cell information in the entry of buffer 820, dequeue the address corresponding to that entry from address list 810, and start the timer corresponding to that entry in timer array 830 [act 940].

If the buffering system 720 receives a data cell in a memory read reply from memory 240 [act 950], buffering system 720 may retrieve from buffer 820, the cell information corresponding to the data cell and forward the data cell and cell information to reorder unit 340 [act 960]. Buffering system 720 may also place the address corresponding to the entry in buffer 820 back into address list 810 for subsequent reuse [act 970]. The buffering system 720 may also stop and reset the timer from timer array 830 associated with the entry [act 970].

Figure 10:
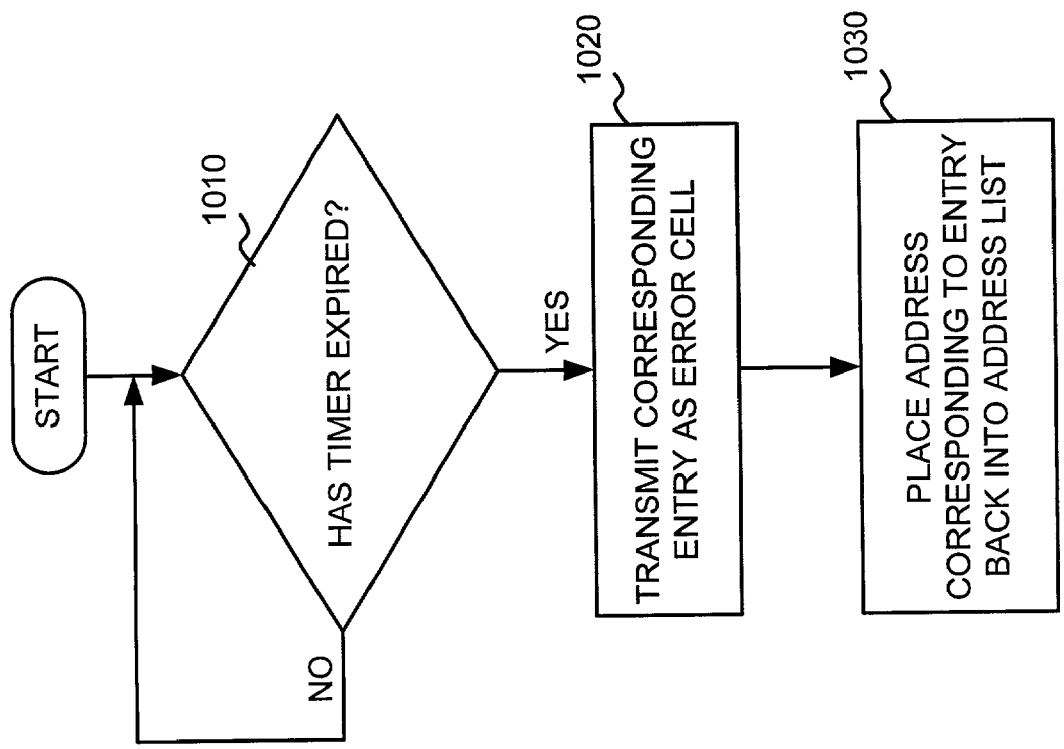
FIG. 10 illustrates an exemplary process for clearing an entry of the buffer of FIG. 8 in an implementation consistent with the principles of the invention.

FIG. 10 illustrates an exemplary process for clearing a stale entry of buffer 820 of FIG. 8 in an implementation consistent with the principles of the invention. Processing may begin with a timer in timer array 830 indicating that a predetermined period of time has passed [act 1010]. In response, buffering system 720 transmits the entry corresponding to the timer to reorder unit 340 in the form of an error cell [act 1020]. This improves system operations by allowing reorder unit 340 to continue operating without having to wait extended periods of time for the cell information. Once the cell information has been sent to reorder buffer 340, buffering system 720 requeues the address corresponding to that entry in address list 810 [act 1030].

The foregoing description of preferred embodiments of the principles of the invention provides illustration and description, but is not intended to be exhaustive or to limit the invention to the precise form disclosed. Modifications and variations are possible in light of the above teachings or may be acquired from practice of the invention. For example, while series of acts have been described in FIGS. 5, 6, 9, and 10, the order of the acts may vary in other implementations consistent with the principles of the invention. And, non-dependent acts may be performed in parallel. No element, act, or instruction used in the description of the principles of the application should be construed as critical or essential to the invention unless explicitly described as such.

The scope of the invention is defined by the claims and their equivalents.

What is claimed is:

1. A method for managing a buffer comprising entries, comprising:
    receiving information;
    determining whether an entry in a buffer contains valid information;
    transmitting an error message if the entry contains valid information; and
    storing the received information in the entry.
2. The method of claim 1 wherein the buffer is a circular buffer.
3. The method of claim 1 further comprising:
    receiving subsequent information;
    determining whether another entry in the buffer contains valid information;
    transmitting a second error message if the next entry contains valid information; and
    storing the received subsequent information in the another entry.
4. The method of claim 1 further comprising:
    receiving a read reply from a memory;
    transmitting the read reply and the received information; and
    clearing a valid indication associated with the entry.
5. The method of claim 1 further comprising:
    determining a period of inactivity;
    obtaining a pointer value that identifies one of the plurality of entries in response to the determining a period of inactivity; and
    transmitting an error message based on the one entry.
6. The method of claim 5 further comprising:
    clearing a valid indication associated with the one entry.
7. The method of claim 5 further comprising:
    determining entries that include valid indications; and
    transmitting error messages for entries that includes valid indications.
8. The method of claim 7 further comprising:
    clearing the valid indications of the entries that include valid indications.
9. The method of claim 5 wherein the act of determining a period of inactivity comprises:
    determining whether the period of inactivity exceeds a predetermined threshold.
10. The method of claim 1 wherein the information comprises at least one of a sequence number, cell type information, or destination information.
11. A network device comprising:
    a memory configured to store data;
    a buffer device comprising entries; and
    a memory read unit configured to:
        generate a read request for data,
        transmit the read request to the memory,
        determine whether one of the entries contains valid information,
        transmit an error message if the entry contains valid information, and
        store information relating to the read request in the one entry.

12. The network device of claim 11 wherein the buffer device includes a circular buffer.

13. The network device of claim 12 wherein the memory read unit is further configured to:
generate a second read request,
determine whether another entry in the buffer device contains valid information,
transmit an error message when the another entry contains valid information, and
store information relating to the second read request in the another entry.

14. The network device of claim 11 wherein each entry of the buffer device is associated with a validity indication, and wherein the memory read unit is further configured to:
receive from the memory a read reply corresponding to one of the entries in the buffer device,
transmit the read reply and information in the one entry, and
clear a validity indication associated with the one entry.

15. The network device of claim 11 wherein the information relating to the read request includes at least one of a sequence number, cell type information, or destination information.

16. The network device of claim 11 further comprising:
a self-cleaning engine configured to:
determine a period of inactivity,
obtain a pointer value that identifies one of the plurality of entries in response to determining the period of inactivity, and
transmit an error message if the one entry includes a valid indication.

17. The network device of claim 16 wherein the self-cleaning engine is further configured to:
clear a validity indication associated with an entry.

18. The network device of claim 16 wherein the self-cleaning engine is further configured to:
determine whether other entries include validity indications; and
transmit error messages based on entries that include validity indications.

19. The network device of claim 16 wherein the self-cleaning engine is further configured to:
clear the validity indications.

20. The network device of claim 16 wherein the self-cleaning engine is further configured to:
determine whether the period of inactivity exceeds a predetermined threshold.

21. A method for managing a buffer comprising entries, comprising:
detecting a traffic flow condition;
obtaining a pointer value that identifies one of the entries in response to the traffic flow condition; and
transmitting information in the one entry as an error message.

22. The method of claim 21 wherein each of the entries is associated with a validity indication, and
wherein the method further comprises:
clearing a validity indication in the one entry.

23. The method of claim 21 further comprising:
determining whether another entry includes a valid indication; and
transmitting information in the another entry as an error message when the another entry includes a valid indication.

24. The method of claim 23 further comprising:
clearing a valid indication associated with the another entry.

25. A system comprising:
a buffer comprising entries, each entry associated with a validity bit; and
a self-cleaning engine configured to:
detect a traffic flow condition,
determine whether the validity bit associated with one of the entries is set, and
transmit an error message if the validity bit associated with the one entry is set.

26. The system of claim 25 wherein the self-cleaning engine is further configured to:
clear the validity bit associated with the one entry.

27. The system of claim 25 wherein the self-cleaning engine is further configured to:
determine whether the validity bits associated with other entries of the buffer are set, and
clear other entries of the buffer associated with validity bits that are set.

28. The system of claim 25 wherein the one entry is associated with a current write pointer.

29. The system of claim 25 wherein the self-cleaning engine comprises:
a first register configured to track the traffic flow condition,
a second register configured to store a threshold value, and
a pointer register configured to store a current write pointer.

30. The system of claim 29 wherein, when detecting a traffic flow condition, the self-cleaning engine is configured to:
compare a value in the first register to the threshold time value.

31. A method for managing a buffer comprising entries, each entry configured to store data and associated with a timer, comprising:
storing data in one of the entries of the buffer;
removing an address corresponding to the one entry from an address list;
starting the timer associated with the one entry;
determining whether the timer has exceeded a predetermined value;
transferring the data from the one entry when the timer has exceeded the predetermined value; and
adding the address back to the address list.

32. The method of claim 31 wherein the data comprises information relating to a read memory request, and
wherein the method further comprises:
receiving a read reply;
transferring the information and the read reply;
resetting the timer; and
adding the address back to the address list.

33. The method of claim 31 wherein the transferring the data from the one entry when the timer has exceeded the predetermined value comprises:
transferring the data as an error message.

34. The method of claim 31 wherein the data comprises one or more of a sequence number, cell type information, or destination information.

35. The method of claim 31 further comprising:
resetting the timer after the transferring.

36. A buffering system comprising:
a buffer comprising entries;
timers, each timer associated with one of the entries and configured to:
track an amount of time that information has been stored in the associated entry, and determine whether the amount of time has exceeded a predetermined value; and an address list configured to store addresses corresponding to those entries of the plurality of entries that are available.

37. The buffering system of claim 36 wherein an entry of the buffer is transmitted when the amount of time in the associated timer exceeds the predetermined value.

38. The buffering system of claim 37 wherein the entry of the buffer is transmitted as an error message.

39. A system for managing a buffer comprising entries, comprising:

means for receiving information relating to a read memory request for a memory;

means for determining whether a validity bit associated with an entry of the buffer is set;

means for transmitting information in the entry in an error message when the validity bit is set; and means for storing the received information in the entry.

40. A method for forwarding data, comprising receiving data;

determining whether an entry comprising information relating to the data is valid;

transmitting the data and the entry information when the entry is valid; and dropping the data when the entry is invalid.

* * * * *